Dec. 26, 1950 W. E. BUSH 2,535,119
CALCULATOR
Filed Dec. 23, 1949 5 Sheets—Sheet 1

INVENTOR.
WILLIAM E. BUSH
BY
ATTORNEY

INVENTOR.
WILLIAM E. BUSH
BY
ATTORNEY

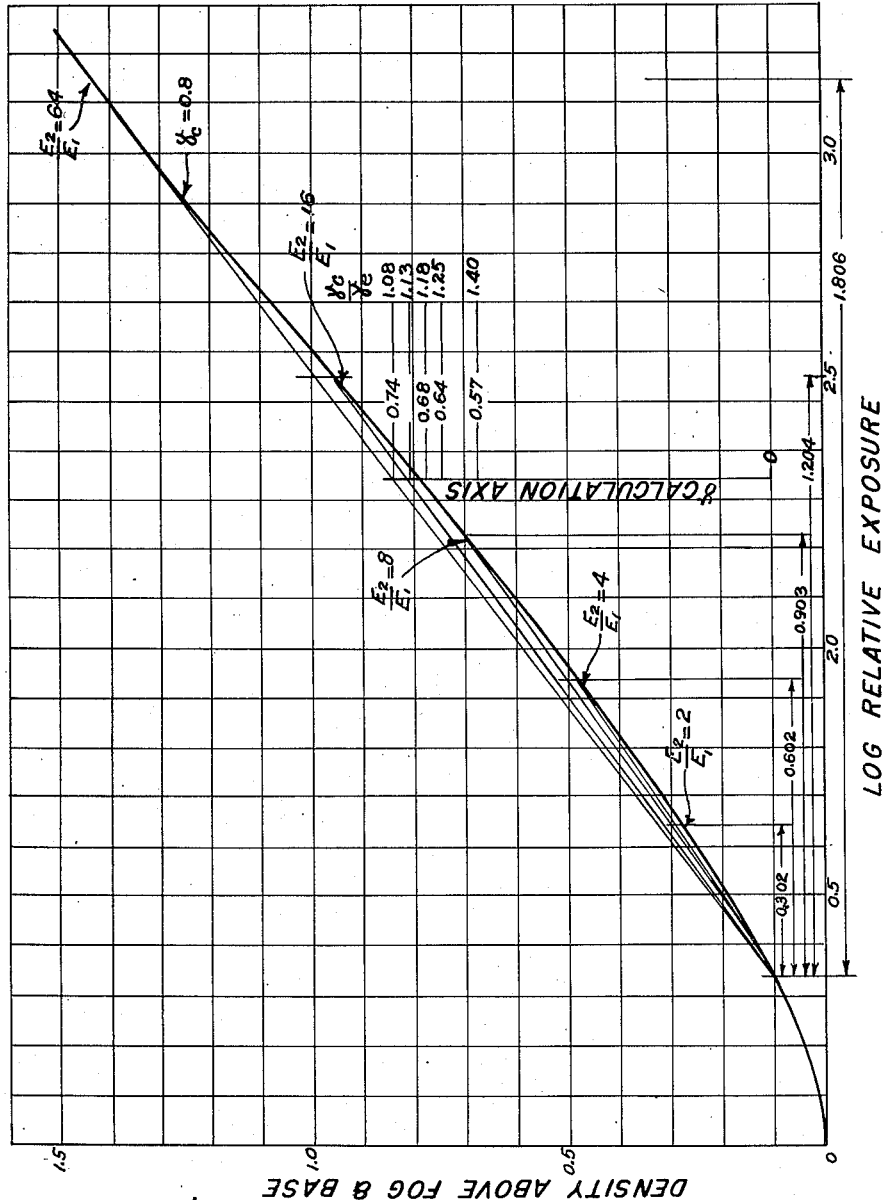

Dec. 26, 1950  W. E. BUSH  2,535,119
CALCULATOR
Filed Dec. 23, 1949  5 Sheets-Sheet 5
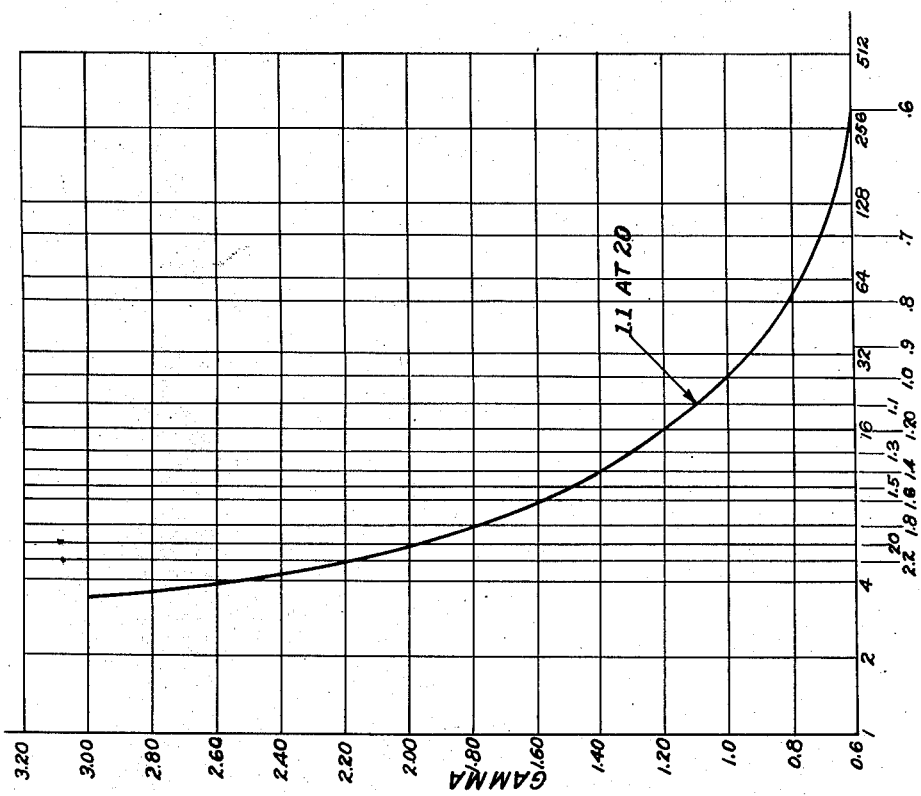
INVENTOR.
WILLIAM E. BUSH
BY
ATTORNEY Patented Dec. 26, 1950

2,535,119

UNITED STATES PATENT OFFICE 2,535,119

CALCULATOR

William E. Bush, Shell Beach, Calif.

Application December 23, 1949, Serial No. 134,694

5 Claims. (Cl. 235—64.7)

The invention, in general, relates to the art of photography and more particularly relates to improved calculator means for rapidly and effectively resolving development factors involved in photographic negatives and developer materials whereby optimum final prints may be obtained.

In recent years, considerable development has occurred not only in photographic papers, photographic emulsions and developer materials but also in that phase of the photographic art pertaining to the measurement of the intensity of reflected light. As a consequence of the latter development, various types of photographic exposure meters have been provided which most photographers possess. The present invention is dependent upon exposure meter readings and is directed to the provision of a gamma guide for the required development of photographic negatives to effect uniform and satisfactory prints on photographic paper of specified exposure scale. "Gamma," as used in the photographic art, is the development factor, the values of which depend upon the time of development. As is well known to those skilled in the art, the value of gamma increases during development and tends to reach a limit or gamma infinity, which measures the extreme contrast of which a plate or a photographic paper is capable. Also, that the velocity of the re-action of development depends upon the value of gamma infinity which is a property of the sensitive material although also to some extent of the developing solution and of K, the velocity constant of development which, in turn, is dependent upon the composition temperature of the developer.

A primary object of the present invention is to provide an improved calculator for the direct calculation of the gamma required of a photographic negative as indicated by the readings of highlight and shadow brightnesses on any type of photographic exposure meter, or other device by which intensity of reflected light may be measured.

Another important object of the invention is to provide an improved calculator of the indicated nature which is additionally characterized by its capacity of co-ordinating the usual theoretical relation between paper scale and exposure range to the practice of using short exposure in order to utilize the advantage obtained in the "toe" distortion characteristics of photographic negative materials.

A still further object of the invention is to provide an improved calculator of the aforementioned character which affords correction for average losses of image contrast due to lens flare as well as the even more important internal illumination of the camera due to reflection of light from the internal surfaces of the camera and the negative material during exposure.

Other objects of the invention, together with some of the advantageous features thereof, will appear from the following description of a preferred embodiment of my invention which is illustrated in the accompanying drawings. It is to be understood that I am not to be limited to the precise embodiment shown, nor to the precise arrangement of the various scales and part thereof, as my invention, as defined in the appended claims, can be embodied in a plurality and variety of forms.

Referring to the drawings.

Figure 1:
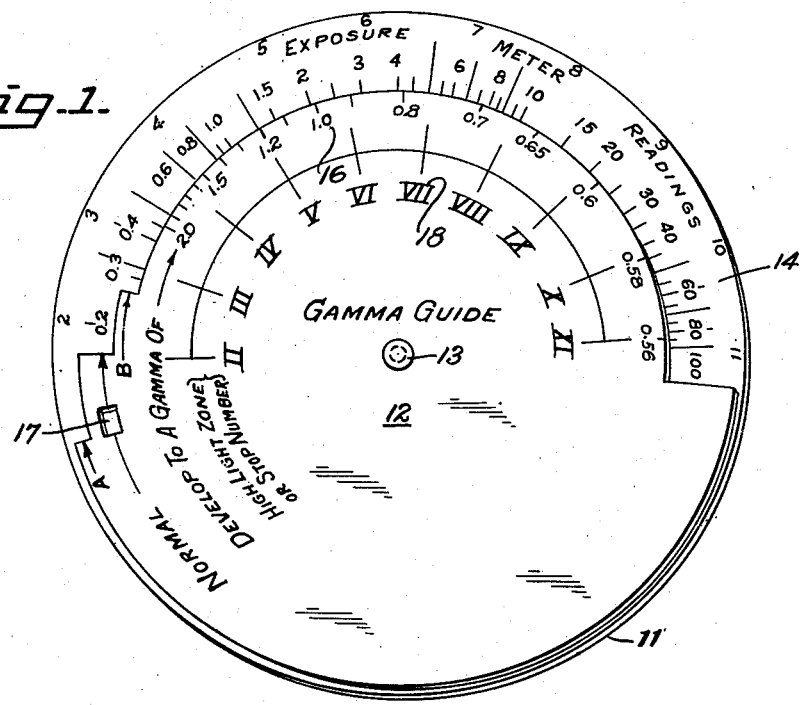
Fig. 1 is a partial perspective view of a preferred embodiment of the present invention.
Figure 3:
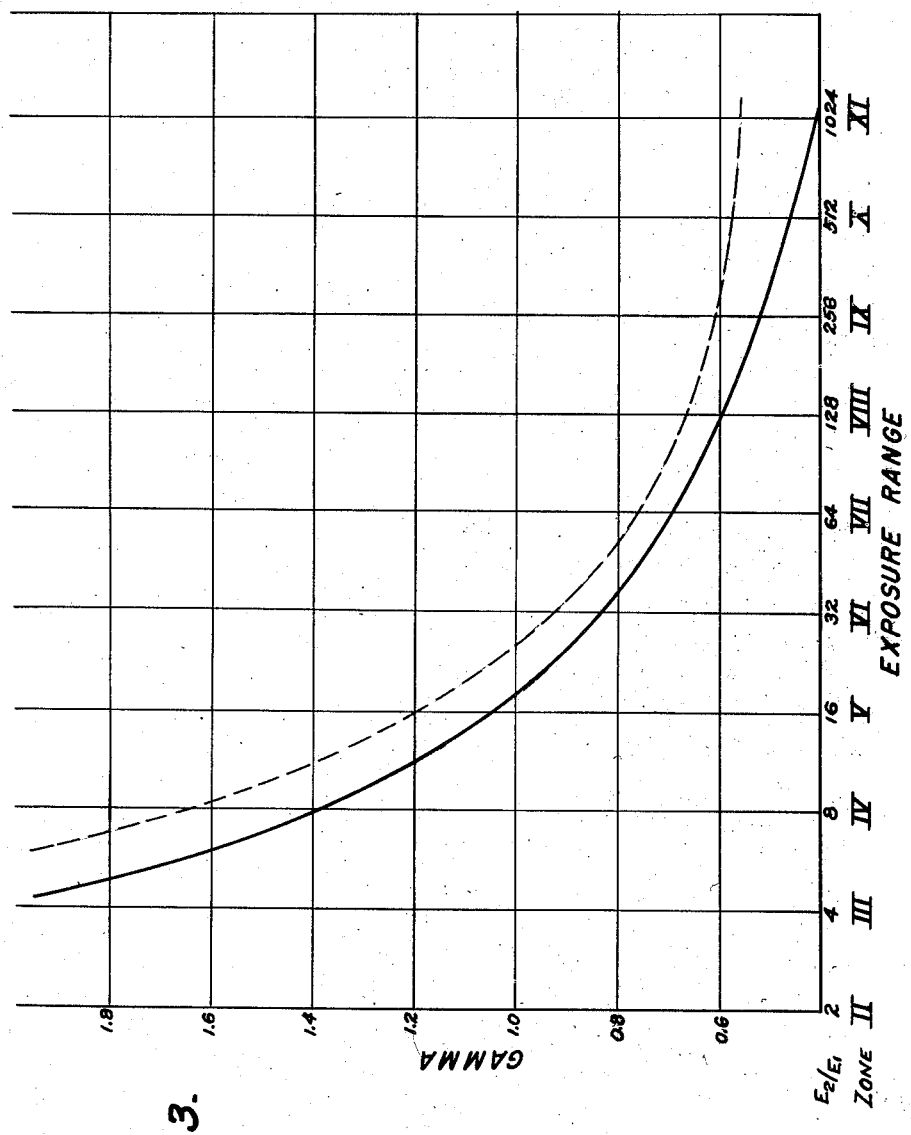

Fig. 3 is a view of two plotted curves wherein the full line curve is the theoretical gamma v. exposure range curve and the dotted line curve is a corrected gamma v. exposure range curve plotted from correction factors necessitated by flare and reflection at high exposure ratios; the gamma values of the dotted line curve being delineated on the upper sector of the preferred embodiment of the invention illustrated in Fig. 1 in co-relation to high-light zones.

Figure 4:
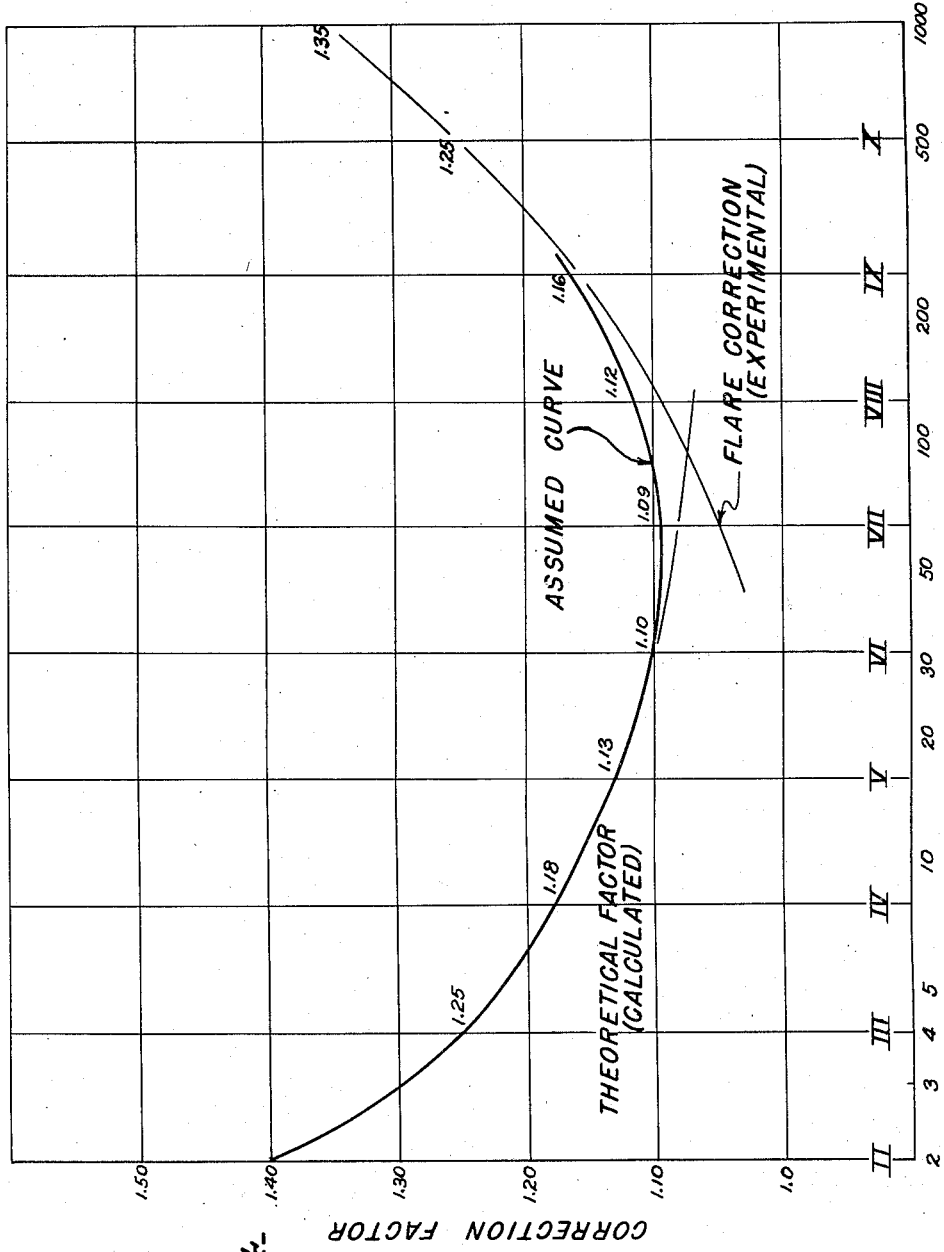

Fig. 4 is a view of plotted curves wherein the full line curve represents assumed gamma v. exposure ranges and the broken line curve represents calculated theoretical factors affecting gamma and experimental flare corrections affecting gamma v. exposure range; these plotted curves serving as one basis for plotting the corrected gamma curve of Fig. 3.

Fig. 5 is a view of a series of density-log E response curves for an average sort of emulsion developed to an assumed gamma of 0.8; these curves are being plotted in order to establish a reasonable correction for gamma and utilizing a point of density of 0.1 above fog and base density as the starting point for the average gradients for several exposure ratios ($E_2-E_1$), the ratio of the assumed gamma of 0.8 to the mean gradient being determined and plotted as the calculated section of the correction factor curve of Fig. 4.

Fig. 6 is a view of a layout curve wherein was plotted gamma v. the ratio of highest brightness to shadow brightness and with an assumed ratio of 18 to 1 as the scale of the photographic material upon which a final print is to be made; this curve merely being for layout purposes for obtaining the corrected "developed to a gamma of" scale delineated on the upper sector of the preferred embodiment of the invention illustrated in Fig. 1.

In its preferred form, my improved calculator preferably comprises a base, an upper sector mounted on said base for relative movement with respect thereto; said base containing scale delineations of exposure meter readings in linear divisions as well as in photographic stops, and said upper sector containing scale delineations of gamma co-related to said scales of exposure meter readings on said base as well as scale delineations of high-light zones or of photographic stop numbers co-related to said delineated scale of gamma on said upper sector, together with setting indices on said upper sector for compensating for unusual equipment combinations. (A photographic stop constitutes a factor of two in light intensity).

As will be apparent from a study of the annexed drawings, my improved calculator is primarily based upon the well known theoretical relation that:

$$\text{Gamma} = \frac{\text{Log } S}{\text{Log}\frac{E_2}{E_1}}$$

where gamma is the gamma to which the negative must be developed, S is the scale of the photographic material upon which the print is to be made, $E_2$ is the high-light brightness, and $E_1$ is the shadow brightness. The high-light and shadow brightness may be employed interchangeably with exposure meter readings if the meter used is calibrated linearly with illumination on its light-sensitive cell or photometric wedge.

While the calculator is based on the above theoretical relation, my improved calculator alters the relation in two important aspects based upon, in the first instance, good exposure practice and optical image contrast due to lens flare as well as internal reflections in all cameras. In the second instance, since good exposure practice utilizes the so-called "toe" of the response curve of the negative material, the gamma of negatives must be increased over the theoretical linear values quoted in time-gamma data by the manufacturer of photographic materials, an important factor when the ratio of high-light brightness to shadow brightness is relatively small, and gamma corrections are reflected on the scale delineation of "Develop To Gamma Of" on the upper sector of my improved calculator, see Fig. 1, to meet average popularly used materials for such relatively low ratios. And, because of lens flare and internal camera reflections, empirical gamma corrections are also reflected to the scale delineations of "Develop to a Gamma Of" on the upper sector of the calculator. These corrections have been plotted in Figs. 4 and 5 and the corrected values for gamma are shown by the dotted line curve of Fig. 3 of the annexed drawings.

Figure 2:
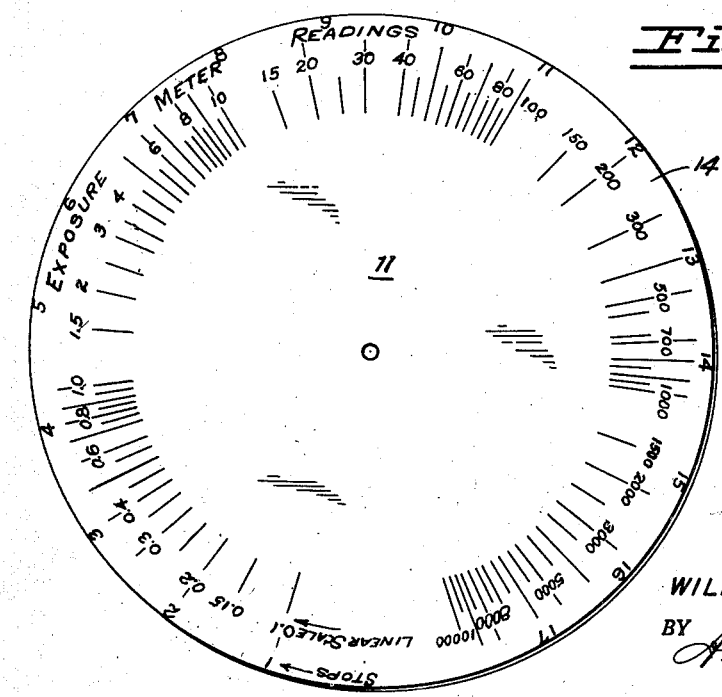
Fig. 2 is a top plan view of one of the parts of the preferred embodiment of the invention.

As illustrated particularly in Figs. 1 and 2 of the annexed drawings, the preferred embodiment of my improved calculator comprises a base 11, an upper sector 12, together with means, such as a rivet 13 for mounting the sector 12 on the base 11 for relative movement with respect thereto. The base 11 preferably is circular in shape and in the preferred embodiment thereof is delineated with a logarithmic scale, generally designated by the reference numeral 14, of the ratios of $E_2$ to $E_1$, or high-light brightness to shadow brightness, of an optical image; the scale being circumferentially graduated on base 11 by placing the anti-log in positions proportional to a radially linear placing of the logarithms. Base 11 also is delineated circumferentially, adjacent to its periphery with spaced consecutive numbers or photographic stops 1 to 17 inclusive, in correlated positions to the logarithmic scale 14; such stops being in accordance with conventional exposure meters calibrated in photographic stops over the exposure range from high-light brightness to shadow brightness.

The upper sector 12 of my improved calculator preferably is cut away to afford three "setting" points, designated by arrows and the reference A; normal; and B. Moreover, the upper sector 12 is delineated with a "Develope to Gamma Of" scale; generally designated by the reference numeral 16, such scale being derived from the potted curves of Figs. 4 and 5 and as so corrected to the values plotted in the dotted line curve of Fig. 3. In order to facilitate the reading of the logarithmic scale 14 on base 11 when the setting point, designated A, of the upper sector is used, the upper sector 12 is formed with a window opening 17 therein through which the readings of scale 14 may be made. In addition, upper sector 12 is delineated with a scale of high-light zones or stop numbers, designated generally by the reference numeral 18, which is circumferentially graduated in accordance with standard or conventional exposure meters calibrated in zones for the range of high-light brightness to shadow brightness.

It will appear from a study of the plotted curves of Figs. 3 to 6 inclusive, as well as the scale delineations of the base 11 and upper sector 12 that in my improved calculator it is assumed that the exposure of the negative is to be made such that the lowest light intensities to be recorded in the final print are to produce a density on the negative of approximately 0.1 above the fog and base level. This is arbitrarily chosen as being practicable; a matter well verified in practice. This means that the non-linear "toe" of the emulsion response curve is to be utilized. Since the time-temperature-gamma data quoted by manufacturers of photographic emulsion is always based upon the average slope of the response curve at densities high enough to be independent of the "toe" flattening, it is evident that correction must be made. The correction, has been worked out as illustrated in Fig. 5 of the annexed drawings. Moreover, for the purpose of this calculator, the scale of the paper has been assumed to be 18:1 which is a ratio suitable to apply to average contrast grades of most manufacturers' papers where used with the usual run of photographic equipment. Any other ratio could, of course, be used for special adaptations.

Since the conditions of flare and reflection vary considerably in various pieces of equipment, an individual user may find that negatives developed to these specifications dictated by the calculator are consistantly too "flat" or too "contrasty." In order to provide reasonable correction for this, the calculator settings above mentioned, in addition to the calculated scales, are provided which afford the corrections by a constant percentage of contrast ratio and provide for adequately wide variations in equipment. To this end, and as herein above set forth, the upper sector 12 contains delineations and setting points designated A. with arrow, Normal, with arrow, and B. with arrow. Under usual conditions of development, the calculator of my present invention is to be used with the setting designated "Normal, with arrow" and the negative developed to the gamma indicated on the calculator will be satisfactorily printed upon a single contrast grade of paper as long as the equipment used in taking the photograph is not changed. If the contrast is lower than desired, setting "A, with arrow" of the calculator should be used instead of the "Normal, with arrow" and in this case the user of the calculator should make use of the window opening 17 for reading the logarithmic scale on base 11. However, if the negatives are more contrasty than desired, the setting "B, with arrow" should be used in determining the gamma to which the negative must be developed. The use of my improved calculator is as follows:

1. Using an exposure meter, the scale of which is linear with the light intensity, (such as the Weston Master Exposure Meter) read the light from the darkest area of the scene which it is desired to reproduce on the final print;

2. Place the setting arrow of the upper scale, marked "Normal, with arrow" on this selected reading on the logarithmic scale on base 11;

3. Determine the light reading on the brightest area (highest reading) in the scene to be photographed (this may be the sky or a piece of white paper) which it is desired to record;

4. Without moving the calculator dial or setting from its previous setting, find the highlight reading on the logarithmic scale 14 on base 11 of the calculator;

5. Opposite the highlight reading, note the gamma to which the negative must be developed in order to produce a density range which will print the entire tone range on average contrast paper; and 6. Then referring to manufacturers' time-gamma data for the particular film and development combination being used, determine the time of development required to produce the gamma specified by the calculator.

The calculator of the present invention can also be used to determine the highlight zone numbers since if the settings are made as indicated above, the highlight meter reading will be opposite the highlight zone number. That is to say, for those who use the "zone system," the procedure is simplified by direct use of the highest highlight zone or stop number. In this case, the exposure meter is set for shadow exposure, by exposing shadows in zone II or zone III; see the delineations on the upper sector 12 of the improved calculator designated "Highlight Zone or Stop Number" together with the numerals II to XI inclusive and marked for the purpose of this application as 18. The highlight zone number is then determined on such meter and the required gamma is directly indicated on the "Develop To A Gamma Of" scale marked by the reference numeral 16 in Fig. 1 of the drawing.

In the event that the exposure meter with which the camera is equipped is calibrated in "Stops," the same procedure is to be followed except that the exposure meter readings scale used will be the outer scale of base numbered 1 to 17 inclusive. See Figs. 1 and 2 of the drawings. It is to be understood, of course, that the "Stops" scale can be re-designed to match any exposure meter scale, the only requirement being that the actual light intensity being measured be adjusted to the linear scale position shown.

The foregoing description of my improved calculator includes references to the actual photographing of the image and it is to be understood that the exposure of the film should be based upon the ASA film speed rating and be adjusted so that the darkest shadow to be recorded occurs at about one step above the exposure threshold of the film. Then, as to the calculator, the arrow position found to be most satisfactory for the particular equipment combinations being used, such as the arrow position or setting A, the arrow setting Normal, or the arrow position B, see Fig. 1 of the annexed drawings, should be employed for determining the gamma to which the negative must be developed for optimum results in the final print.

It is to be understood that the appended claims are to be accorded a range of equivalents commensurate in scope with the advance made over the prior art.

I claim:

1. A calculator for determining the gamma to which a photographic negative must be developed with reference to contrast grade of paper of specified scale, as a function of high-light and shadow brightness of the subject being photographed, said calculator comprising a base, an upper sector mounted on said base for movement relative thereto; said base having delineations thereon defining a logarithmic scale of exposure meter readings co-ordinated with the specified scale of the contrast grade of paper, and said upper sector having delineations thereon defining a gamma scale correlated to said logarithmic scale with respect to high-light and shadow brightness of the subject for proper development of the negative.

2. A calculator for determining the gamma to which a photographic negative must be developed with respect to contrast grade of paper of specified scale, as a function of high-light and shadow brightness of the subject being photographed, said calculator comprising a base, an upper sector mounted on said base for movement relative thereto; said base having delineations thereon defining a logarithmic scale of exposure meter readings co-ordinated with the scale of the contrast grade of paper, and said upper sector having delineations thereon defining a gamma scale correlated to said logarithmic scale with respect to high-light and shadow brightness of the subject for proper development of the negative, as well as having a plurality of setting points delineated thereon for defining the development depending upon the emulsion characteristics of the paper used for the photographic prints and the optical characteristics of the photographic equipment used.

3. A calculator for determining the gamma to which a photographic negative must be developed comprising a base containing a logarithmic scale of exposure meter readings as well as a scale of photographic stops, and an upper sector movably mounted on said base and having portions thereof cut away to define a plurality of setting points; said sector having a gamma scale delineated thereon co-ordinated with the exposure meter scale as well as with the scale of photographic stops on said base whereby the gamma to which a negative must be developed may be determined by utilizing any selected one of said setting points and moving said sector in relation to said base and said exposure meter scale or said scale of photographic stops with respect to the high-light brightness of the negative which is to be developed.

4. A calculator for determining the gamma to which a photographic negative must be developed as defined in claim 3 and wherein said sector includes a scale of high-light zone numbers co-ordinated with said gamma scale.

5. A calculator as defined in claim 1, and including a plurality of setting points on said sector which are adapted to be used alternately or selectively as desired.

WILLIAM E. BUSH.

REFERENCES CITED

The following references are of record in the file of this patent:

UNITED STATES PATENTS

| Number | Name | Date |
|---|---|---|
| 1,429,463 | Squyer | Sept. 19, 1922 |

OTHER REFERENCES

"The Theory of the Photographic Process," by C. D. Kenneth Mees, published by the Macmillan Co., N. Y. 1946, pages 761 and 762.